United States Patent
Basov et al.

(10) Patent No.: US 10,242,012 B1
(45) Date of Patent: Mar. 26, 2019

(54) MANAGING TRUNCATION OF FILES OF FILE SYSTEMS

(71) Applicant: EMC Corporation, Hopkinton, MA (US)

(72) Inventors: Ivan Basov, Brookline, MA (US); Philippe Armangau, Upton, MA (US); William C. Davenport, San Diego, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 738 days.

(21) Appl. No.: 14/870,556

(22) Filed: Sep. 30, 2015

(51) Int. Cl.
*G06F 17/30* (2006.01)
*G06F 3/06* (2006.01)

(52) U.S. Cl.
CPC ........ *G06F 17/30088* (2013.01); *G06F 3/065* (2013.01); *G06F 3/0619* (2013.01); *G06F 3/0689* (2013.01); *G06F 17/30182* (2013.01)

(58) Field of Classification Search
CPC .................... G06F 17/30088; G06F 17/30227
USPC ........................................................ 707/626
See application file for complete search history.

(56) References Cited

U.S. PATENT DOCUMENTS

| 8,032,498 | B1* | 10/2011 | Armangau | G06F 17/30088 707/690 |
| 8,943,282 | B1* | 1/2015 | Armangau | G06F 17/30088 711/126 |
| 9,442,955 | B1* | 9/2016 | Pawar | G06F 17/30227 707/687 |
| 2008/0077590 | A1* | 3/2008 | Pandit | G06F 11/1435 707/704 |

* cited by examiner

*Primary Examiner* — Shahid A Alam
(74) *Attorney, Agent, or Firm* — Krishnendu Gupta; Deepika Bhayana

(57) ABSTRACT

A method is used in managing truncation of files of file systems. A request is received to delete a portion of a file of a file system. A set of extents associated with the portion of the file is determined where the file has been identified for deletion. A replica of the set of extents is created. The replica represents a state of the set of extents at a particular prior point in time. The portion of the file is deleted by updating metadata of the file. The replica is asynchronously deleted in background.

18 Claims, 8 Drawing Sheets

MANAGING TRUNCATION OF FILES OF FILE SYSTEMS

CROSS REFERENCE TO RELATED APPLICATIONS

This application is related to co-pending U.S. patent application Ser. No. 14/870,514 entitled MANAGING TRUNCATION OF FILES OF FILE SYSTEMS filed on Sep. 30, 2015, which is incorporated herein by reference.

BACKGROUND

Technical Field

This application relates to managing truncation of files of file systems.

Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Additionally, the need for high performance, high capacity information technology systems are driven by several factors. In many industries, critical information technology applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases.

In data storage systems where high-availability is a necessity, system administrators are constantly faced with the challenges of preserving data integrity and ensuring availability of critical system components. One critical system component in any computer processing system is its file system. File systems include software programs and data structures that define the use of underlying data storage devices. File systems are responsible for organizing disk storage into files and directories and keeping track of which part of disk storage belong to which file and which are not being used.

An operating system, executing on a data storage system such as a file server, controls the allocation of a memory of the data storage system to host systems or clients connected to the data storage system. Allocation is generally performed at a page granularity, where a page is a selected number of contiguous blocks. The particular size of a page is typically a function of an operating system, the page size may be 8 kilobytes (KB).

To the operating system of a data storage system, a file system is a collection of file system blocks of a specific size. For example, the size of a file system block may be 8 kilobytes (KB). As the data storage system is initialized, some of the pages are reserved for use by the operating system, some pages are designated as 'free' for allocation to other applications, and a large chunk of pages are reserved to provide a buffer cache (also referred to as "buffer cache pool"). The buffer cache temporarily stores pages in a volatile memory of a data storage system that are also stored in an attached disk device to increase application performance.

File systems typically include metadata describing attributes of a file system and data from a user of the file system. A file system contains a range of file system blocks that store metadata and data. A user of a file system access the file system using a logical address (a relative offset in a file) and the file system converts the logical address to a physical address of a disk storage that stores the file system. Further, a user of a data storage system creates one or more files in a file system. Every file includes an index node (also referred to simply as "inode") that contains the metadata (such as permissions, ownerships, timestamps) about that file. The contents of a file are stored in a collection of data blocks. An inode of a file defines an address map that converts a logical address of the file to a physical address of the file. Further, in order to create the address map, the inode includes direct data block pointers and indirect block pointers. A data block pointer points to a data block of a file system that contains user data. An indirect block pointer points to an indirect block that contains an array of block pointers (to either other indirect blocks or to data blocks). There may be many levels of indirect blocks arranged in a hierarchy depending upon the size of a file where each level of indirect blocks includes pointers to indirect blocks at the next lower level.

A file may be replicated by using a snapshot copy facility that creates one or more replicas (also referred to as "snapshot copies") of the file. A replica of a file is a point-in-time copy of the file. Further, each replica of a file is represented by a version file that includes an inheritance mechanism enabling metadata (e.g., indirect blocks) and data (e.g., direct data blocks) of the file to be shared across one or more versions of the file.

Although existing various methods provide reasonable means of writing data to file systems stored to a persistent storage, providing access to data of file systems and creating a replica of file systems, they also come with a number of challenges, especially when efficiently truncating a file of a file system. It may be difficult or impossible for the conventional file system facility to efficiently truncate a file of a file system.

SUMMARY OF THE INVENTION

A method is used in managing truncation of files of file systems. A request is received to delete a portion of a file of a file system. A set of extents associated with the portion of the file is determined where the file has been identified for deletion. A replica of the set of extents is created. The replica represents a state of the set of extents at a particular prior point in time. The portion of the file is deleted by updating metadata of the file. The replica is asynchronously deleted in background.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
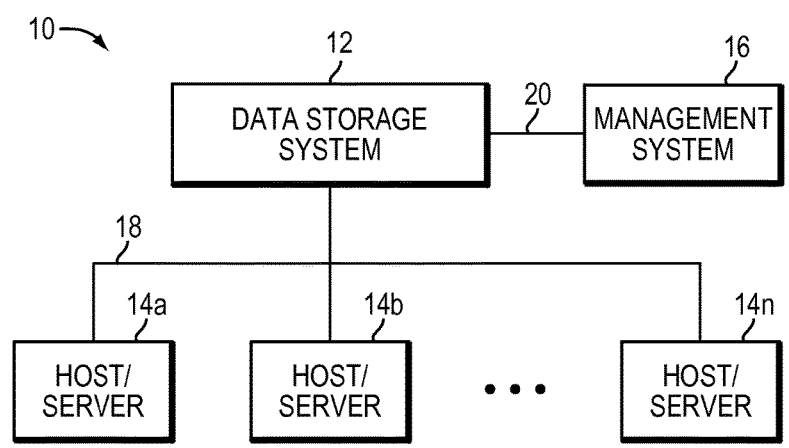
FIGS. 1-2 are examples of an embodiment of a computer system that may utilize the techniques described herein.

Described below is a technique for use in managing truncation of files of file systems, which technique may be used to provide, among other things, receiving a request to delete a portion of a file of a file system, determining a set of extents associated with the portion of the file identified for deletion, creating a replica of the set of extents, where the replica represents a state of the set of extents at a particular prior point in time, deleting the portion of the file by updating metadata of the file, and asynchronously deleting the replica in background.

Generally, a storage extent is a logical contiguous area of storage reserved for a user requesting the storage space. A storage extent may include a set of disks having different RAID levels. A disk may be a physical disk within the storage system. A LUN may be a logical unit number which is an identifier for a logical unit representing a portion of disk storage. Each slice of data may have a mapping to the location of the physical drive where it starts and ends. A LUN presented to a host system may be organized as a file system by a file system mapping logic of a storage system.

A file is uniquely identified by a file system identification number. Each data block of a file is referenced by a logical block number and/or file system block number. A logical block number of a file refers to a data block by relative position of the data block inside the file. A file system block number of a file refers to a data block by relative position of the data block on a physical disk device on which the file is stored. A file system block number for a data block is computed based on a file offset and the size of the data block. Further, an inode of a file includes metadata that provides a mapping to convert a file system block number of a data block to its corresponding logical block number. For example, in case of a data block size of 4 kilobytes (KB), if a file offset value is smaller than 4096 bytes, the file offset corresponds to the first data block of the file, which has file block number 0. Further, for example, if a file offset value is equal to or greater than 4096 bytes and less than 8192 bytes, the file offset corresponds to the second data block of the file, which has file block number 1.

Generally, each file system data block of a file is associated with a respective mapping pointer. A mapping pointer of a file system block points to the file system block and includes metadata information for the file system block. A file system block associated with a mapping pointer may be a data block or an indirect block which in turn points to other data blocks or indirect blocks. A mapping pointer includes information that help map a logical offset of a file system block to a corresponding physical block address of the file system block.

Further, a mapping pointer of a file system block includes metadata information for the file system block such as a weight that indicates a delegated reference count for the mapping pointer. The delegated reference count is used by a snapshot copy facility when a replica of a file is created. Mapping pointers of the inode of the file are copied and included in the inode of the replica of the file. Mapping pointers of the inode may include mapping pointers pointing to direct data blocks and mapping pointers pointing to indirect blocks. The delegated reference count values stored in the mapping pointers of the file and the replica of the file are updated to indicate that the file and the replica of the file share data blocks of the file.

The delegated reference counting mechanism is described in U.S. Pat. No. 8,032,498 for "Delegated reference count base file versioning" issued Oct. 4, 2011, which is incorporated herein by reference.

Further, the delegated reference counting mechanism is also used by a deduplication facility for performing deduplication on a set of identical data blocks by sharing the set of identical data blocks and keeping a single copy of data block such that other identical data blocks point to the single copy of the data block.

Thus, a delegated reference count is a way of maintaining block ownership information for indicating whether or not each indirect block or data block of a file is shared with another version of the file or another identical data block. Further, as introduced above, files are organized as a hierarchy of file system blocks including inodes, indirect blocks, and data blocks. The hierarchy of file system blocks includes a parent-child block relationship between a parent object that points to a child object. For example, if the mapping pointer of the inode of a file points to a data block, the association between the mapping pointer of the inode and the data block may be viewed as a parent-child block relationship. Similarly, for example, if the mapping pointer of an indirect block of a file points to a data block, the association between the mapping pointer of the indirect block and the data block may be viewed as a parent-child block relationship. Block ownership information is maintained by storing respective reference counts for the file system indirect blocks and file system data blocks in the file system block hierarchy, and by storing respective delegated reference counts for the parent-child block relationships in the file system block hierarchy. For each parent-child block relationship, a comparison of the respective delegated reference count for the parent-child relationship to the reference count for the child block indicates whether or not the child block is either shared among parent blocks or has a single, exclusive parent block. For example, if the respective delegated reference count is equal to the respective reference count, then the child block is not shared, and the parent block is the exclusive parent of the child block. Otherwise, if the respective delegated reference count is not equal to the respective reference count, then the child block is shared among parent blocks.

Further, when a sharing relationship of a file system block is broken, the reference count in the per-block metadata of the file system block is decremented by the delegated reference count associated with mapping pointer of the file system block.

A snapshot (also referred to herein as "replica", "checkpoint", and "snap") is a point-in-time copy of data (e.g., a production file). Generally, storage applications use snapshots to protect production data and ensure consistency of the production data. Generally, snapshots of data are created at a regular time interval (e.g., 10 minutes, 1 hour). Each snapshot of data has a unique identification. When an old snapshot is deleted, storage space allocated to the old snapshot is reclaimed and metadata associated with the old snapshot is updated appropriately. A set of replicas of a file (also referred to herein as "working file" or "primary file") may be logically organized together in a version set. A version set indicates a family of snapshot copies.

Typically, a file delete operation deletes a file of a file system in a storage system. When a file is deleted, each file system block of the file is deleted and marked as a free file system block. Further, a file may be truncated by deleting a portion of the file. Generally, during a file truncate operation, each file system block that is a part of a portion of the file which is being truncated is deleted. When a file system block is deleted, a parent file system block which includes a mapping pointer pointing to the file system block is updated to indicate that the mapping pointer no longer points to the file system block. By updating the mapping pointer in such a way creates a hole such that the mapping pointer is marked as unused indicating that the mapping pointer no longer points to any file system block.

Generally, upon receiving a request to delete a file or a portion of the file (also referred to herein as "truncating a file"), a file system hierarchy of the entire file or the portion of the file is iterated to free each file system block of the file system hierarchy of the entire file or the portion of the file. An indirect block at the lowest level of a file system hierarchy of a file is known as a leaf indirect block. Thus, each leaf indirect block of the file system hierarchy of a file or a portion of the file is processed for deleting data blocks pointed to by each leaf indirect block. It should be noted that a file delete or file truncate operation may either be executed on a primary file or any replica of the primary file.

Conventionally, a file truncate operation to truncate a file by deleting a portion of the file traverses a file system block hierarchy associated with the portion of the file in order to delete each file system block included in the portion of the file, de-allocates each file system block included in the portion of the file identified for deletion, and creates a metadata transaction entry for each file system block deleted by the file truncate operation. In such a conventional system, if a delete operation or a truncate operation is performed on a large number of files, for example, hundreds of files with the size of 100 gigabytes (GB), the delete or truncate operations may require a large amount of time such as hours to delete or truncate the files because the delete or truncate operations either traverses the entire file system block hierarchy or a large portion of the file system block hierarchy of each file for de-allocating file system blocks and creates a metadata transaction entry for each file system block being deleted and stores the metadata transaction entry in a file system transaction log, and later updates metadata organized on a storage device by flushing the file system transaction log. Further, in such a conventional system, reading and updating of per-block metadata structures of each file system block of a file system hierarchy of each file being truncated requires a significant amount of time in case the size of the file system block hierarchy is large. Consequently, in such a conventional system, a large number of resources of a storage system are consumed resulting in increase in CPU consumption because a large amount of data and/or metadata is copied to and from a memory and a large number of locks for file system and storage system structures are acquired and released.

Thus, in such a conventional system, depending on the size of a file, truncate operation can potentially take hours to complete. Conventionally, when a truncate operation is performed synchronously on a file, a lock is acquired on the file for the entire duration of time the truncate operation is being performed on the file. Consequently, in such a conventional system, when a lock is acquired on a file for performing a truncate operation, a storage system is unable to perform any other operation on the file requested by clients of the storage system. Further, in such a conventional system, if a truncate operation is performed asynchronously on a file, it may be difficult or impossible to maintain correct locking semantics for processing various truncate, write and read operations being issued concurrently on the file.

Thus, conventionally, truncating a file consumes a large amount of storage resources such as CPU and I/O load because a large amount of metadata is accessed and updated when truncating the file. Further, in such a conventional system, a significant amount of time is spent deleting a file thereby impacting performance of other I/O operations executing concurrently in a storage system. Further, in such a conventional system, if a large number of files are truncated, the amount of time required to delete the large number of files may impact performance of other facilities executing in such a conventional system. Thus, in such a conventional system, truncating a large number of files may consume a large amount of time thereby causing a delay in reclaiming storage space associated with portions of the files identified for truncation. Thus, a goal of the current invention is to efficiently truncate files in order to increase performance of a system by performing less number of I/O operations and consuming less storage resources (e.g., CPU and cache) of the system.

For example, in such a conventional system, if a storage system receives following series of request: 1) request to write a data pattern to a file starting from file offset of 0x6429fb to 0x64a564, 2) a truncate operation to truncate the file to size 0x81f62, and 3) a request to write data to the file at offset 0x1109ad7 to increase the size of the file. In such a conventional case, a read request performed at the file offset of 0x6450ec may return stale data (e.g., data written by the first write instead of empty data (e.g., zeros)) because the truncate operation indicated by the second request above herein may be performed on the file after the write data request, the first request indicated above herein, thereby providing old data to a client due to incorrect semantics employed by the conventional storage system. Further, in such a conventional system, when a range lock is acquired for the entire portion of a file identified for truncation or deletion during performance of a truncate operation or a delete operation, a concurrent write operation pending on the file may timeout while waiting for the truncate operation to finish as the truncate operation in such a conventional case may require a significant amount of time (e.g., hours) to complete because the truncate operation requires time to free each data block included in a file system block hierarchy identified for deletion by the truncate operation.

By contrast, in at least some implementations in accordance with the technique as described herein, the current technique optimizes file truncate and file delete operations by creating an internal snapshot copy of a file identified for truncation or deletion and deleting the file by using delegated reference count mechanism thereby improving performance of the file truncate and delete operations and reducing impact of the file truncate and delete operations on a storage system. In at least one embodiment of the current technique, initially, each file system block included in a file are shared between the file and the internal snapshot copy of the file created upon receiving a truncate operation. Thus, in at least one embodiment of the current technique, a file can be truncated in a short amount of time because deleting such shared file system blocks include updating metadata of the file to indicate that the file no longer references the shared file system data blocks instead of having to deallocate each file system block is performed in a conventional system. Further, in at least one embodiment of the current technique, the internal snapshot copy of a file is deleted asynchronously in the background to deallocate file system blocks associated with a truncate operation directed to the file. It should be noted that an internal snapshot copy of a file created when performing a truncate operation is not visible to a user or host of a storage system but used internally by the storage system to efficiently truncate the file. Further, when a subsequent truncate operation is received for the file and an internal snapshot copy of the file is being truncated in background, another snapshot copy of the file is created to perform the subsequent truncation operation on the file.

Further, when a snapshot copy is created for a file, the snapshot copy represents the state of the entire file at a specific point in time. Thus, in at least one embodiment of the current technique, when an internal snapshot (also referred to herein as "replica") of a file is created during a file truncate operation and later deleted in background, entire file system block hierarchy of the internal snapshot is evaluated and processed for deleting the internal snapshot thereby increasing the amount of storage resources required to delete a snapshot because the file system block hierarchy of the internal snapshot includes portions of the file that has not been identified for deletion. Thus, by creating a snapshot copy of an entire file increases the amount of time it requires to delete the snapshot copy and increases the amount of system resources required to make a determination whether a write split is required for a shared file system block.

Thus, in at least one embodiment of the current technique, instead of creating an internal snapshot copy of an entire file during a file truncate operation, a list of extents associated with a portion of the file identified for truncation is created and an internal snapshot copy of file system blocks that are included in the list of extents are created thereby leaving the rest of the portion of file as holes in a file system hierarchy of the internal snapshot copy. Thus, by creating a replica of only a portion of a file that has been identified for deletion enables a storage system to delete the replica in a short amount of time by avoiding processing a portion of a file system hierarchy of the file that has not been identified for deletion. It should be noted that the current technique of creating a replica of only a portion of file may be used for other file system operations and not just during a file truncate or a file delete operation.

An extent is a contiguous area of storage space reserved for a file in a file system, represented as a range. An extent may represent a contiguous area of storage space that has been reserved on a logical volume such that the storage space may be placed in a random order on a storage device. A file may consist of zero for more extents. A portion of a file may include one or more extent.

A snap delete is a process that deletes file system blocks included in a file system hierarchy of a snap of a storage object such as a file by de-allocating the file system blocks. It should be noted that the term "snap delete", "replica delete", "file delete", and "file truncate" may be used herein interchangeably.

In at least one embodiment of the current technique, distributed weight for each shared data block included in a portion of file system hierarchy of a file identified for file truncation or file deletion is updated to return the weight value of a shared data block to an internal snapshot copy of the file indicating that the file no longer references to the shared data block. Thus, in at least one embodiment of the current technique, metadata of a file identified for truncation or deletion is updated in a short amount of time such that an internal snapshot of the file may be deleted at a later time to free storage resources associated with a portion of the identified for deletion during a truncate operation.

Generally, per-block metadata (also referred to herein as "BMD") of a file system block stores a total distributed reference count value for the file system block. Further, a metadata transaction entry created for a file system block that is being deleted indicates return of the reference count value (or "weight") of the file system block to the per-block metadata of the file system block.

Further, in at least one embodiment of the current technique, a file system block associated with a portion of a file being truncated is deleted based on the ownership status of the file system block. Thus, a delete operation on a file system block decrements the reference count in the per-block metadata of a child block by a full weight or a partial weight depending on whether or not the deleted file system block did not share the child block or did share the child block.

Further, in at least one embodiment of the current technique, if a file system block is not shared but owned by a parent file system block which points to the file system block, the owned file system block is deleted by freeing the file system block. Further, when a file system block of a file of a file system is deleted, metadata such as superblock of the file, the size of the file, and a mapping pointer in a parent file system block pointing to the file system block is updated to indicate that the file system block is a free file system block which may be reused. It should be noted that any number of improvement may be employed when deleting a file system block shared between a file and an internal snapshot copy of the file.

In at least some implementations in accordance with the technique as described herein, the use of the managing truncation of files of file systems technique can provide one or more of the following advantages: improving memory utilization by reducing the number of times file system locks are acquired and released, improving I/O performance of a system by reducing the number of I/Os generated during a file delete and file truncate operations, improving host I/O performance by efficiently deleting or truncating a file by reducing the number of metadata transactions and the number of times metadata is retrieved from a storage device, improving performance of truncate or delete operations by efficiently using storage resources (e.g., CPU and cache) of a system, and efficiently updating metadata entries.

Referring now to FIG. 1, shown is an example of an embodiment of a computer system that may be used in connection with performing the technique or techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In at least one embodiment, the communication medium 20 may be a LAN connection and the communication medium 18 may be an iSCSI or SAN through fibre channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, FCoE and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In at least one embodiment, the hosts may communicate with the data storage systems over an iSCSI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16. The manager may also configure a data storage system, for example, by using management software to define a logical grouping of logically defined devices, referred to elsewhere herein as a storage group (SG), and restrict access to the logical group.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrated the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with other components than as described herein for purposes of example.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

It should be noted that each of the data storage systems may operate stand-alone, or may also included as part of a storage area network (SAN) that includes, for example, other components such as other data storage systems.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes. The logical volumes may or may not correspond to the actual disk drives. For example, one or more logical volumes may reside on a single physical disk drive. Data in a single storage system may be accessed by multiple hosts allowing the hosts to share the data residing therein. A LUN (logical unit number) may be used to refer to one of the foregoing logically defined devices or volumes. An address map kept by the storage array may associate host system logical address with physical device address.

In such an embodiment in which element 12 of FIG. 1 is implemented using one or more data storage systems, each of the data storage systems may include code thereon for performing the techniques as described herein. In following paragraphs, reference may be made to a particular embodiment such as, for example, an embodiment in which element 12 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein. As will be appreciated by those skilled in the art, the data storage system 12 may also include other components than as described for purposes of illustrating the techniques herein.

The data storage system 12 may include any one or more different types of disk devices such as, for example, an ATA disk drive, FC disk drive, and the like. Thus, the storage system may be made up of physical devices with different physical and performance characteristics (e.g., types of physical devices, disk speed such as in RPMs), RAID levels and configurations, allocation of cache, processors used to service an I/O request, and the like.

In certain cases, an enterprise can utilize different types of storage systems to form a complete data storage environment. In one arrangement, the enterprise can utilize both a block based storage system and a file based storage hardware, such as a VNX™ or VNXe™ system (produced by EMC Corporation, Hopkinton, Mass.). In such an arrangement, typically the file based storage hardware operates as a front-end to the block based storage system such that the file based storage hardware and the block based storage system form a unified storage system.

Figure 2:
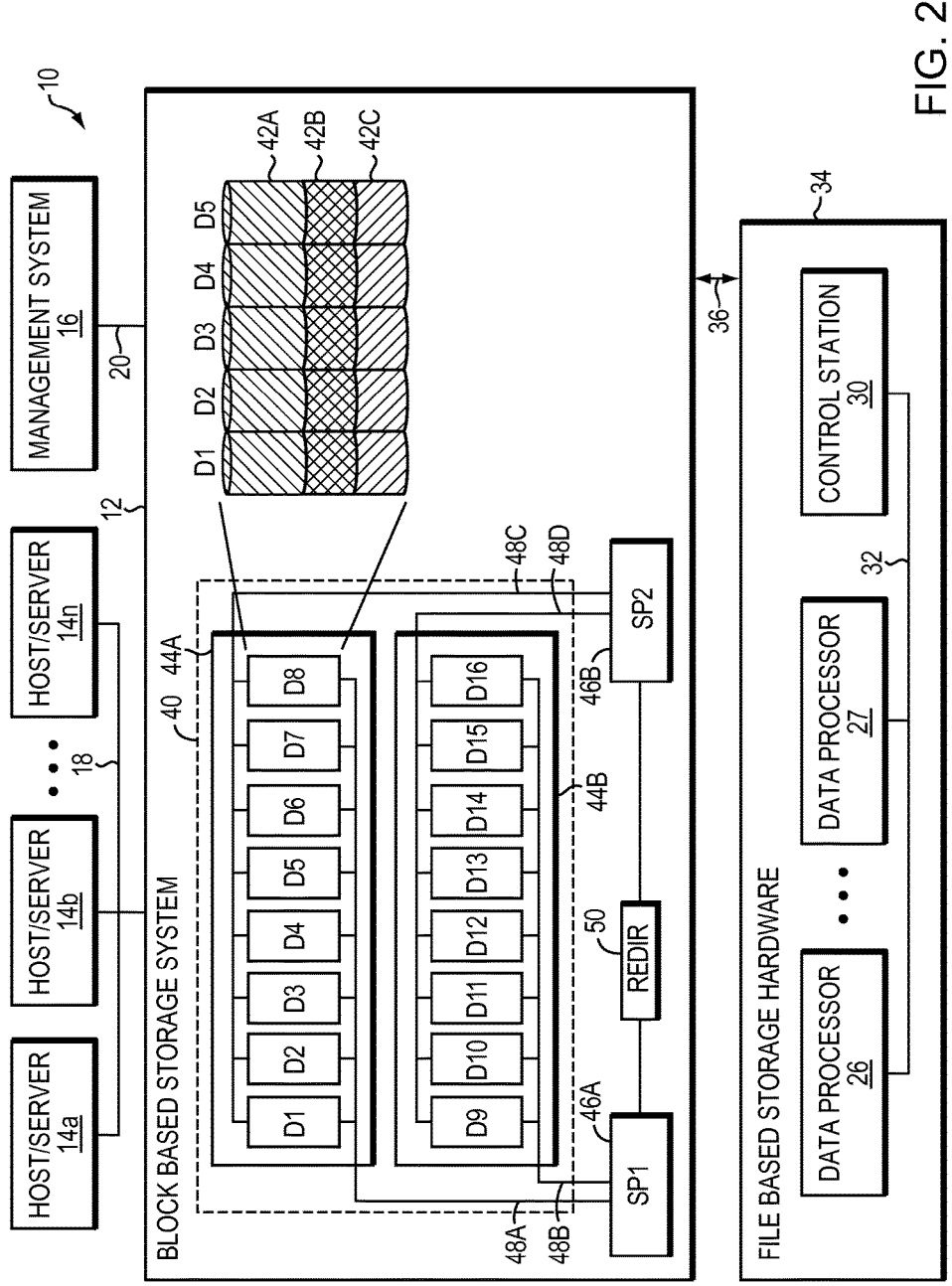

Referring now to FIG. 2, shown is an example of an embodiment of a computer system such as a unified data storage system that may be used in connection with performing the technique or techniques described herein. As shown, the unified data storage system 10 includes a block based storage system 12 and file based storage hardware 34. While the block based storage system 12 may be configured in a variety of ways, in at least one embodiment, the block based storage system 12 is configured as a storage area network (SAN), such as a VNX™ or VNXe™ system, as produced by EMC Corporation of Hopkinton, Mass. While the file based storage hardware 34 may be configured in a variety of ways, in at least one embodiment, the file based storage hardware 34 is configured as a network attached storage (NAS) system, such as a file server system produced by EMC Corporation of Hopkinton, Mass., configured as a header to the block based storage system 12.

The computer system 10 includes one or more block based data storage systems 12 connected to host systems 14a-14n through communication medium 18. The system 10 also includes a management system 16 connected to one or more block based data storage systems 12 through communication medium 20. In this embodiment of the computer system 10, the management system 16, and the N servers or hosts 14a-14n may access the block based data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the block based data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the block based data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multiprocessor system, such as an Intel-based processor, or other type of commercially available processor able to support traffic in accordance with each particular embodiment and application.

In at least one embodiment of the current technique, block based data storage system 12 includes multiple storage devices 40, which are typically hard disk drives, but which may be tape drives, flash memory, flash drives, other solid state drives, or some combination of the above. In at least one embodiment, the storage devices may be organized into multiple shelves 44, each shelf containing multiple devices. In the embodiment illustrated in FIG. 2, block based data storage system 12 includes two shelves, Shelf1 44A and Shelf2 44B; Shelf1 44A contains eight storage devices, D1-D8, and Shelf2 also contains eight storage devices, D9-D16.

Block based data storage system 12 may include one or more storage processors 46, for handling input/output (I/O) requests and allocations. Each storage processor 46 may communicate with storage devices 40 through one or more data buses 48. In at least one embodiment, block based data storage system 12 contains two storage processors, SP1 46A, and SP2 46B, and each storage processor 46 has a dedicated data bus 48 for each shelf 44. For example, SP1 46A is connected to each storage device 40 on Shelf1 44A via a first data bus 48A and to each storage device 40 on Shelf2 44B via a second data bus 48B. SP2 46B is connected to each storage device 40 on Shelf1 44A via a third data bus 48C and to each storage device 40 on Shelf2 44B via a fourth data bus 48D. In this manner, each device 40 is configured to be connected to two separate data buses 48, one to each storage processor 46. For example, storage devices D1-D8 may be connected to data buses 48A and 48C, while storage devices D9-D16 may be connected to data buses 48B and 48D. Thus, each device 40 is connected via some data bus to both SP1 46A and SP2 46B. The configuration of block based data storage system 12, as illustrated in FIG. 2, is for illustrative purposes only, and is not considered a limitation of the current technique described herein. Thus, it should be noted that data storage system 12 may include any number of storage processors.

In addition to the physical configuration, storage devices 40 may also be logically configured. For example, multiple storage devices 40 may be organized into redundant array of inexpensive disks (RAID) groups. Although RAID groups are composed of multiple storage devices, a RAID group may be conceptually treated as if it were a single storage device. As used herein, the term "storage entity" may refer to either a single storage device or a RAID group operating as a single storage device.

Storage entities may be further sub-divided into logical units. A single RAID group or individual storage device may contain one or more logical units. Each logical unit may be further subdivided into portions of a logical unit, referred to as "slices". In the embodiment illustrated in FIG. 2, storage devices D1-D5, is sub-divided into 3 logical units, LU1 42A, LU2 42B, and LU3 42C. The LUs 42 may be configured to store a data file as a set of blocks striped across the LUs 42.

The unified data storage system 10 includes a file based storage hardware 34 that includes at least one data processor 26. The data processor 26, for example, may be a commodity computer. The data processor 26 sends storage access requests through physical data link 36 between the data processor 26 and the block based storage system 12. The data link 36 may be any one or more of a variety of networks or other type of communication connections as known to those skilled in the art. The processor included in the data processor 26 may be any one of a variety of proprietary or commercially available single or multiprocessor system, such as an Intel-based processor, or other type of commercially available processor able to support traffic in accordance with each particular embodiment and application. Further, file based storage hardware 34 may further include control station 30 and additional data processors (such as data processor 27) sharing storage device 40. A dual-redundant data link 32 interconnects the data processors 26, 27 to the control station 30. The control station 30 monitors a heartbeat signal from each of the data processors 26, 27 in order to detect a data processor failure. If a failed data processor cannot be successfully re-booted, the control station 30 will "fence off" the failed data processor and re-assign or fail-over the data processing responsibilities of the failed data processor to another data processor of the file based storage hardware 34. The control station 30 also provides certain server configuration information to the data processors 26, 27. For example, the control station maintains a boot configuration file accessed by each data processor 26, 27 when the data processor is reset.

The data processor 26 is configured as one or more computerized devices, such as file servers, that provide end user devices (not shown) with networked access (e.g., NFS and CIFS facilities) to storage of the block based storage system 12. In at least one embodiment, the control station 30 is a computerized device having a controller, such as a memory and one or more processors. The control station 30 is configured to provide hardware and file system management, configuration, and maintenance capabilities to the data storage system 10. The control station 30 includes boot strap operating instructions, either as stored on a local storage device or as part of the controller that, when executed by the controller following connection of the data processor 26 to the block based storage system 12, causes the control station 30 to detect the automated nature of a file based storage hardware installation process and access the data processor 26 over a private internal management network and execute the file based hardware installation process.

Generally, designs of block-based and file-based data storage systems often follow parallel paths. Further, many of the features provided by block-based storage, such as replication, snaps, de-duplication, migration, failover, and non-disruptive upgrade, are similar to features provided for file-based data storage systems. For user convenience, block-based and file-based storage systems are sometimes co-located, essentially side-by-side, to allow processing of both block-based and file-based host IOs in a single combined system as illustrated in FIG. 2. Alternatively, both block-based and file-based functionality may be combined in an unified data path architecture. The unified data path architecture brings together IO processing of block-based storage systems and file-based storage systems by expressing both block-based objects and file-based objects in the form of files. These files are parts of an underlying, internal set of file systems, which is stored on a set of storage units served by a storage pool. Because both block-based objects and file-based objects are expressed as files, a common set of services can be applied across block-based and file-based objects for numerous operations, such as replication, snaps, de-duplication, migration, failover, non-disruptive upgrade, and/or many other services, as these services are performed similarly for both block and file objects on the same underlying type of object—a file. Further, the unified data path architecture increases storage utilization by reallocating storage resources once allocated to block-based storage to file-based storage, and vice-versa. As block-based objects (e.g., LUNs, block-based vVols, and so forth) and file-based objects (e.g., file systems, file-based vVols, VMDKs, VHDs, and so forth) are expressed as underlying files, storage units released by any underlying file or files can be reused by any other underlying file or files, regardless of whether the files represent block-based objects or file-based objects. Additional details regarding the unified data path architecture is described in U.S. patent application Ser. No. 13/828,322 for "Unified DataPath Architecture", filed Mar. 14, 2013, the contents and teachings of which are hereby incorporated by reference in their entirety.

In at least one embodiment of the current technique, the unified data path architecture requires a file system to be hosted on a mapped LUN as a file system on a file.

Figure 3:
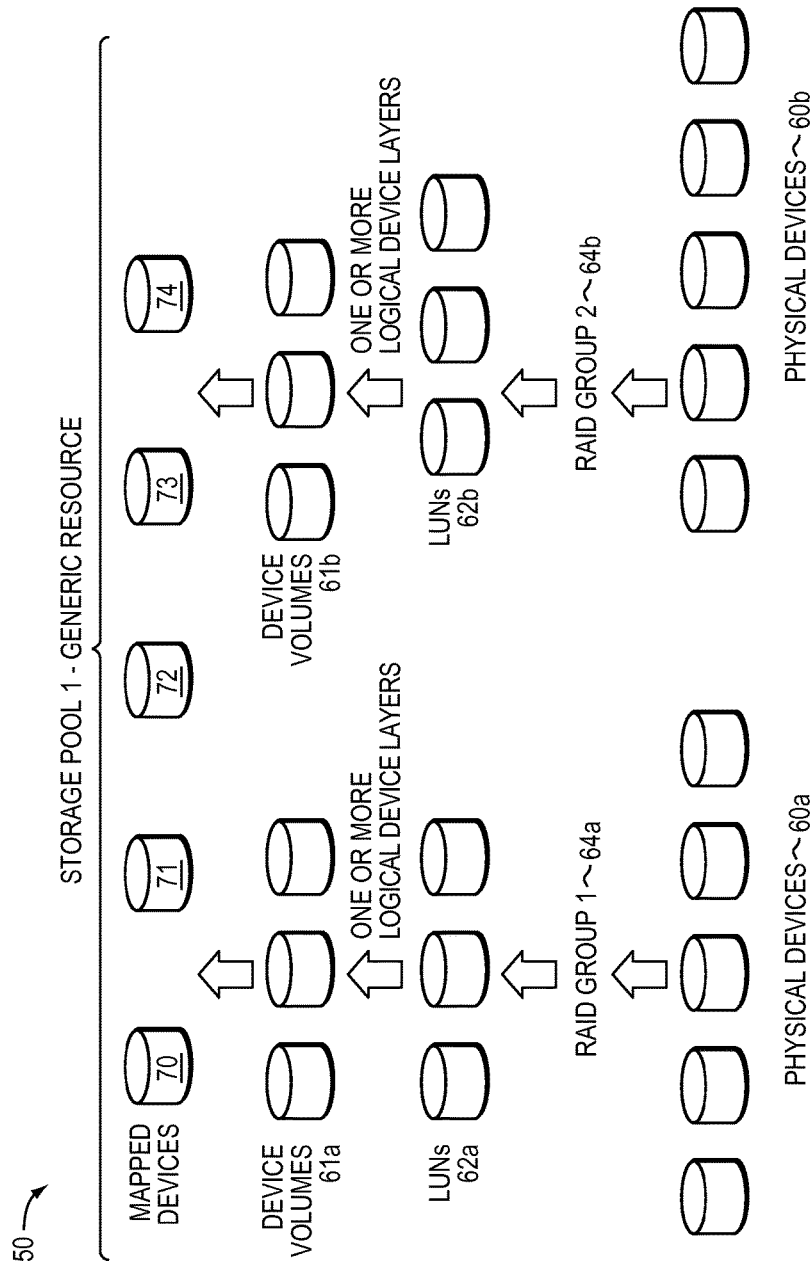
FIG. 3 is an example illustrating storage device layout.

FIG. 3 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62.

The data storage system 12 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the "thin logical unit" ("TLU") mapped device is not mapped directly to physical storage space. Instead, portions of the mapped storage device for which physical storage space exists are mapped to data devices such as device volumes 61*a*-61*b*, which are logical devices that map logical storage space of the data device to physical storage space on the physical devices 60*a*-60*b*. Thus, an access of the logical storage space of the "thin logical unit" ("TLU") mapped device results in either a null pointer (or equivalent) indicating that no corresponding physical storage space has yet been allocated, or results in a reference to a data device which in turn references the underlying physical storage space.

Figure 4:
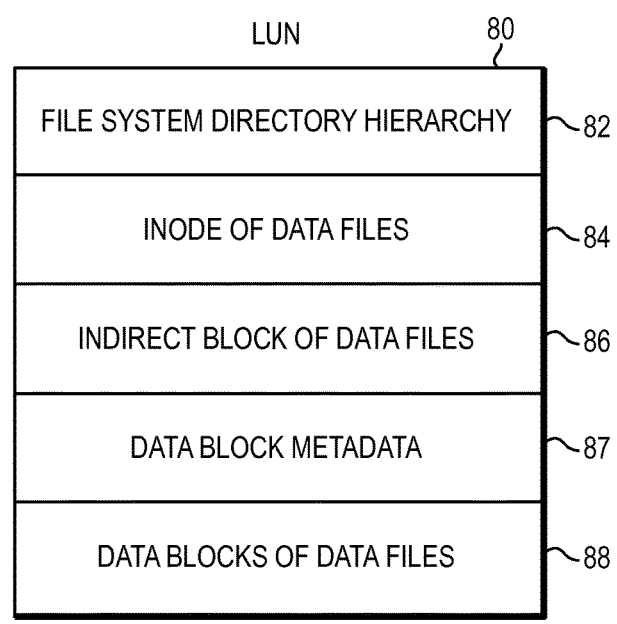
FIGS. 4-8 are diagrams illustrating in more detail components that may be used in connection with techniques herein.

Referring to FIG. 4, shown is a logical representation of a LUN presented to a host and organized as a file system that may be included in an embodiment using the techniques herein. A user of data storage system 12 accesses data from LUNs stored on disk drives 60 in fixed sized chunks. Each fixed size chunk is known as a slice. One or more slices are grouped together to create a slice pool. Host system 14 provisions storage from slice pools for creating LUNs. A LUN 80 is visible to host system 14 and a user of a data storage system 12. Typically, storage is allocated when host system 14 issues a write request and needs a data block to write user's data.

File systems typically include metadata describing attributes of a file system and data from a user of the file system. A file system contains a range of file system blocks that store metadata and data. A file system mapping driver allocates file system blocks from slices of storage for creating files and storing metadata of a file system. In at least some embodiments of the current technique, the file system block may be 8 kilobyte (KB) in size. Further, a user of data storage system 12 creates files in a file system. The file system is organized as a hierarchy. At the top of the hierarchy is a hierarchy of the directories 82 in the file system. Inodes of data files 84 depend from the file system directory hierarchy 82. Indirect blocks of data files 86 depend from the inodes of the data files 84. Data block metadata 87 and data blocks of data files 88 depend from the inodes of data files 84 and from the indirect blocks of data files 86.

A file system includes one or more file system blocks. Some of the file system blocks are data blocks, some file system blocks may be indirect block, as described above, or some file system blocks are free blocks that have not yet been allocated to any file in the file system. In an indirect mapping protocol, such as the conventional indirect mapping protocol of a UNIX-based file system, the indirect mapping protocol permits any free block of the file system to be allocated to a file of the file system and mapped to any logical block of a logical extent of the file. This unrestricted mapping ability of the conventional indirect mapping protocol of a UNIX-based file system is a result of the fact that metadata for each file includes a respective pointer to each data block of the file of the file system, as described below. Each file of the file system includes an inode containing attributes of the file and a block pointer array containing pointers to data blocks of the file. There is one inode for each file in the file system. Each inode can be identified by an inode number. Several inodes may fit into one of the file system blocks. The inode number can be easily translated into a block number and an offset of the inode from the start of the block. Each inode of a file contains metadata of the file. Some block pointers of a file point directly at data blocks, other block pointers of the file points at blocks of more pointers, known as an indirect block. There are at least fifteen block pointer entries in a block pointer array contained in an inode of a file. The first of up to twelve entries of block pointers in the inode directly point to the first of up to twelve data blocks of the file. If the file contains more than twelve data blocks, then the thirteenth entry of the block pointer array contains an indirect block pointer pointing to an indirect block containing pointers to one or more additional data blocks. If the file contains so many data blocks that the indirect block becomes full of block pointers, then the fourteenth entry of the block pointer array contains a double indirect block pointer to an indirect block that itself points to an indirect block that points to one or more additional data blocks. If the file is so large that the indirect block becomes full of block pointers and its descendant indirect blocks are also full of block pointers, then the fifteenth entry of the block pointer array includes another level of indirection where the block pointer entry contains a triple indirect block pointer to an indirect block that points to an indirect block that points to an indirect block that points to one or more additional data blocks. Similarly there exists fourth and fifth level of indirections. Once the indirect blocks at last level of indirection and its descendant indirect blocks become full of pointers, the file contains a maximum permitted number of data blocks. Further, an indirect block at the last level of indirection is also referred to as a leaf indirect block. However, it should be noted that a file system may be organized based on any one of the known mapping techniques such as an extent based binary tree mapping mechanism.

Figure 5:
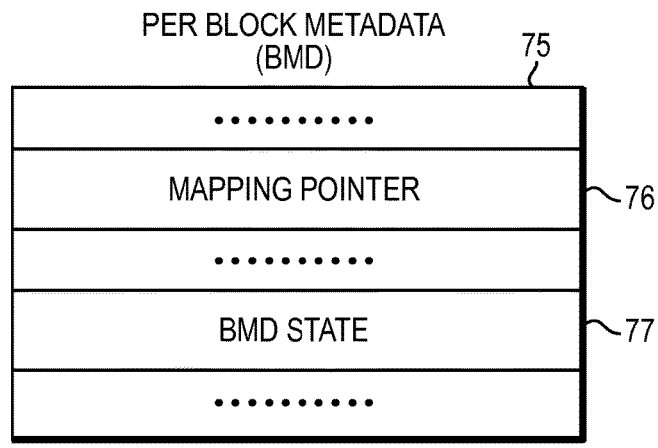

Referring to FIG. 5, shown is a representation of a per block metadata (also referred to as "BMD") for a file system data block that may be included in an embodiment using the techniques described herein. The per-block metadata 75 for a file system data block includes an inode number of a file of the file system, the file system data block number and the logical offset of the file system data block. The per-block metadata 75 for a file system data block also includes an internal checksum protecting the integrity of the information stored in the per-block metadata 75. The per-block metadata for a file system data block may further include a mapping pointer 76 and a data structure indicating state of the per-block metadata 77. The representation of per-block metadata 75, as illustrated in FIG. 5, is for illustrative purposes only, and is not considered a limitation of the current technique described herein.

Figure 6:
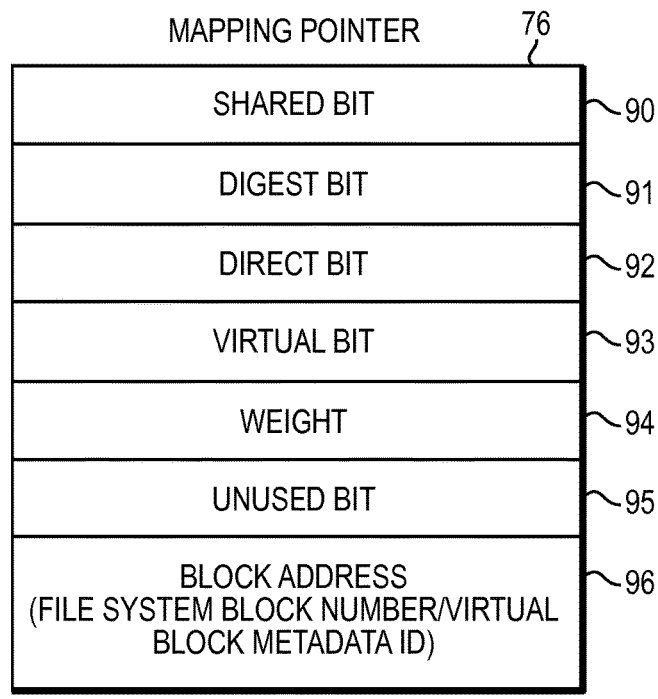

Referring to FIG. 6, shown is a representation of a mapping pointer 75 of a file system data block that may be included in an embodiment using the techniques described herein. Each file system data block of a file is associated with a respective mapping pointer. A mapping pointer of a file system block points to the file system block and includes metadata information for the file system block. A file system block associated with a mapping pointer may be a data block or an indirect block which in turn points to other data blocks or indirect blocks. A mapping pointer includes information that help map a logical offset of a file system block to a corresponding physical block address of the file system block. Mapping pointer 76 includes metadata information such as shared bit 90, digest bit 91, direct bit 92, virtual bit 93, weight 94, unused bit 95 and block address 96. Shared bit 90 of mapping pointer 76 associated with a file system data block indicates whether the data block (or data blocks if the mapping pointer is associated with an indirect block) may be shared. Digest bit 91 of mapping pointer 76 for a file system block indicates whether the file system block has been digested by a deduplication engine. Direct bit 92 of mapping pointer 76 for a file system block indicates whether the physical address of the file system block can be computed algorithmically. Virtual bit 93 of mapping pointer 76 for a file system block indicates whether the mapping pointer is a virtual pointer. Weight 94 of mapping pointer 76 for a file system block indicates a delegated reference count for the mapping pointer 76. The delegated reference count is used by a snapshot copy facility when a replica of a file is created. Mapping pointers of the inode of the file are copied and included in the inode of the replica of the file. In at least one embodiment, mapping pointers of the inode may include mapping pointers pointing to direct data blocks and mapping pointers pointing to indirect blocks. Then, the delegated reference count values stored in the mapping pointers of the file and the replica of the file are updated to indicate that the file and the replica of the file share data blocks of the file. Unused bit 95 of mapping pointer 76 for a file system block indicates an unused space reserved for a future use. Block address 96 of mapping pointer 76 for a file system block indicates the block number of the file system block. Alternatively, block address 96 of mapping pointer 76 may indicate a Virtual Block Metadata ("VBM") identification number which points to a VBM object that points to a data block and includes metadata for the data block. Thus, VBM Id 96 is used to find an object including virtual block metadata. Thus, a VBM object includes file system data block mapping pointer as described in FIG. 6. It also includes a total distributed weight for the VBM object which is the sum of weights of each mapping pointer for a file system block pointing to the VBM object. The VBM object may further includes a mapping pointer which may point to a file system block or another VBM object such that the mapping pointer includes the distributed weight for the mapping pointer.

In response to a request by a client of a storage system to create a snapshot copy of a production file, a virtual block mapping pointer is created that provides a mapping information to a logical block storing data of the file system block of the production file. The file system block includes a pointer pointing back to the metadata of the virtual block mapping pointer. Thus, a new kind of block pointer called virtual block mapping (VBM) pointer enables a migration or re-organization of data blocks to be performed in a non-disruptive fashion that is transparent to a file system manager because pointers to logical data blocks may be changed dynamically without having to change block pointers in inodes and indirect blocks pointing to the data blocks.

The representation of mapping pointer 76, as illustrated in FIG. 6, is for illustrative purposes only, and is not considered a limitation of the current technique described herein. Thus, it should be noted that fields 90-95 included in the mapping pointer 76 may reside in different metadata structures.

Figure 7:
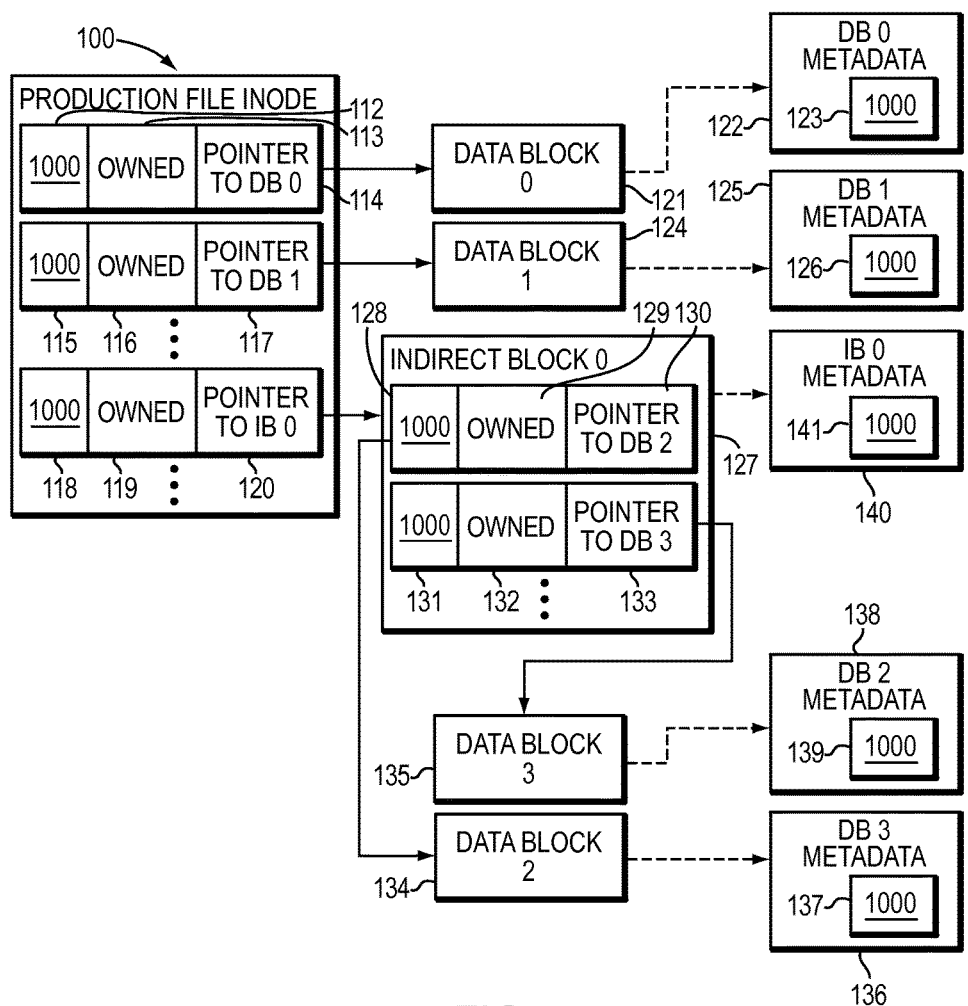

Referring to FIG. 7, shown is a more detailed representation of components that may be included in an embodiment using the techniques described herein. As shown in FIG. 7, for example, a production file inode 100 (also referred to as "working file") includes a set of mapping pointers representing a file system block hierarchy of the production file. The set of mapping pointers includes the first mapping pointer field which further includes a delegated reference count 112, shared flag 113 indicating whether the data block pointed to by the first mapping pointer is shared by other data blocks, and a block pointer 114 pointing to a first file system data block ("Data Block 0") 121. The block pointer 114 is a file system block number of the first data block 121. The first data block 121 has associated per-block metadata 122 including a reference count 123. The per-block metadata 122 of the first data block 121, for example, is organized as table separate from the first data block 121 and indexed by the block number of the first data block 121. Further, the set of mapping pointers includes the second mapping pointer which includes a delegated reference count 115, shared flag 116, and a block pointer 117 pointing to a second file system data block ("Data Block 1") 124. The second data block 124 has associated per-block metadata 125 including a reference count 126. Further, the set of mapping pointers include a mapping pointer that points to an indirect block and includes a delegated reference count 118, shared flag 119, and a block pointer 120 pointing to the indirect block 127. The indirect block ("Indirect block 0") 124 has associated per-block metadata 140 including a reference count 141. The indirect block 124 includes mapping pointers for a set of data blocks pointed to by the indirect block 124, such as, the first mapping pointer which includes a delegated reference count 128, shared flag 129, and a block pointer 130 pointing to a third file system data block ("Data Block 2") 134 and the second mapping pointer which includes a delegated reference count 131, shared flag 132, and a block pointer 133 pointing to a fourth file system data block ("Data Block 4") 135. The third data block 134 has associated per-block metadata 136 including a reference count 137 and fourth data block 135 has associated per-block metadata 138 including a reference count 139.

In the example of FIG. 7, a delegated reference count such as 112 is associated with the parent-child block relationship indicated by the block pointer 114 by storing the delegated reference count in one or more bytes of a mapping block pointer field. The delegated reference count 112, however, could be associated with the parent-child block relationship in other ways. For example, the delegated reference count could be stored in a metadata table of the production file inode 100.

In the example of FIG. 7, a delegated reference count such as 112, 115, 118, 128, 131 has an initial full-weight value of 1,000, and the reference count such as 123, 126, 141, 137, 139 in the per-block metadata such as 122, 125, 140, 136, 138 of file system block such as 121, 124, 127, 134, 135 also has an initial full-weight value of 1,000. In other words, the initial full-weight value of 1,000 should be understood as representing a full ownership interest (i.e., a 100% ownership interest) of the file system data block. A snapshot copy facility delegates a partial ownership interest to a snapshot copy when sharing occurs between a snapshot copy and a production file.

Figure 8:
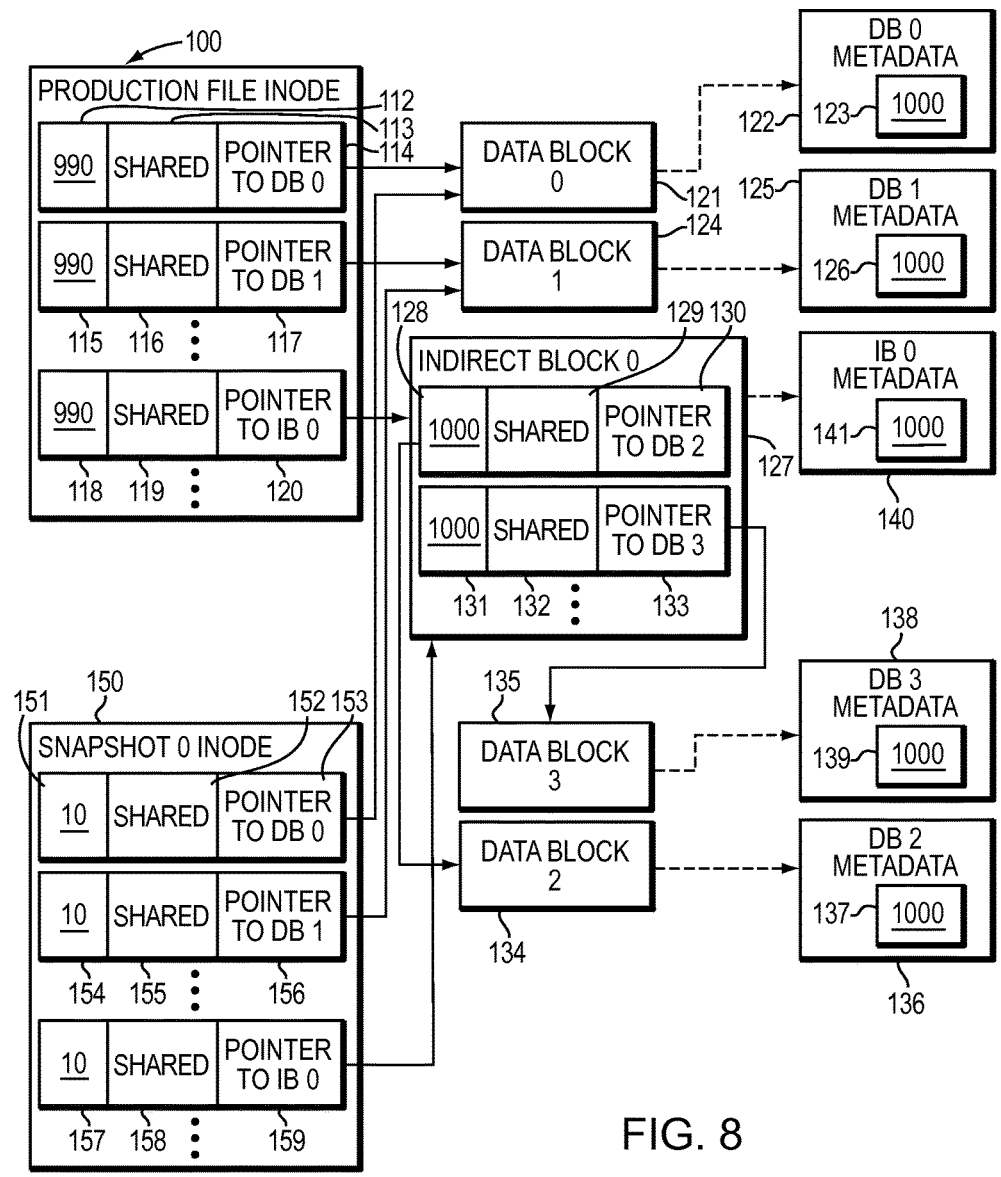

As shown in FIG. 8, when the snapshot copy facility creates a first snapshot copy of the production file, the snapshot copy facility allocates an inode 150 for the snapshot copy, and copies the content of the production file inode 100 into the snapshot copy inode 150. Then the snapshot copy facility decrements each of the delegated reference counts 112, 115, 118 included in the set of mapping pointers of the production file inode 100 by a partial-weight value of 10, and sets the delegated reference counts 151, 154, 157 in each of the mapping block pointer fields of the snapshot inode 150 to the same partial-weight value of 10. Block pointers 153, 156, 159 in snapshot inode 150 of the snapshot copy of production file now points to the same file system blocks 121, 124, 127 and sharing status flag for file system blocks 121, 124, 127 in the production file inode 100 and the snapshot copy inode 150 are updated to indicate that file system blocks 121, 124, 127 are shared by the production file and the snapshot copy of the production file. Thus, the total distributed weight of file system blocks 121, 124, 127 which is total of the delegated reference counts 112, 115, 118 of the primary inode 100 and delegated reference counts 151, 154, 157 of the snapshot inode 150 stays same with the value of 1,000.

Although in general a partial-weight value is simply smaller than a full-weight value, in most cases the ratio of the full-weight value to the partial-weight value may be greater than the maximum number of snapshot copies of a production file. For some applications, a relatively small partial weight in relationship to a limited number of snapshot copies would also permit identification of child blocks exclusively owned or shared only among snapshot files, permitting a rapid delete of all snapshot copies simply by scanning for file system blocks having a reference count value below a certain threshold, and de-allocating all such blocks.

Figure 9:
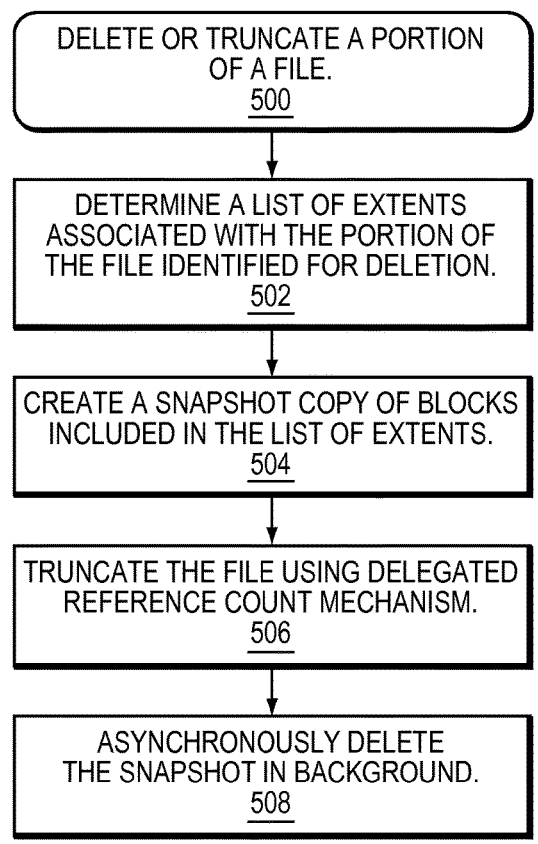
FIG. 9 is a flow diagram illustrating processes that may be used in connection with techniques herein.

In general, the delegated reference counting mechanism as shown in FIGS. 7-9 results in the reference count in the per-block metadata of a child block of a file system being equal to the sum of all the delegated reference counts associated with all of the child's parent blocks in the file system block hierarchy of the file system. The block sharing caused by creation of snapshot copies does not change the reference count in the per-block metadata of a child block.

When a snapshot copy of a file is deleted, a portion of the file is truncated, or a portion of a snapshot copy of the file is truncated, each indirect block in a file system block hierarchy corresponding to a portion of a file or a snapshot copy of the file which is being deleted or truncated is evaluated such that a sibling indirect data block is determined for each indirect data block from file system hierarchies of snapshot copies of the file included in a version set to which the file belongs such that the indirect data block and the sibling indirect data block shares the most data blocks compared to other indirect data blocks in the file system hierarchies. Upon finding a sibling indirect data block for an indirect data block that has been selected for deletion, reference count for each shared data block pointed to by the indirect data block is returned to corresponding shared data block mapping pointer included in the sibling indirect data block instead of updating per-block metadata of each shared data block. It should be noted that an indirect data block may be selected from a file system hierarchy of a file when the file is deleted, the file is truncated, zeros are written to a portion of the file (also referred to as "punching a hole"), or data blocks are freed and returned to a storage device. Returning weight value for each shared data block pointed to by an indirect data block of a file to reference count values in a sibling indirect data block may also be referred to as "reverse indirect block split" operation as it operates in an opposite manner to a write split operation described above herein.

Generally, a delete or truncate operation for a file and/or snap of the file traverses a file system hierarchy for the file or the snap of the file in a top-down manner such that each indirect data block included in such file system hierarchy is traversed until each file system data block in each leaf indirect data block is evaluated. The processing of a leaf indirect data block includes processing each file system data block of the leaf indirect block where sharing status of each file system data block is evaluated. If a file system block of a snap processed for deletion is no longer referenced by any other active snaps, the file system block is deallocated and storage space associated with the file system block is freed. However, if a file system block of a snap processed for deletion is referenced by other active snaps, the file system block is not freed but metadata (e.g., delegated reference count) associated with the file system block is updated to decrement the reference to the file system data block.

Generally, the total distributed reference count value of a file system data block and a sharing status is maintained in per-block metadata of the file system data block. Typically, per-block metadata of a file system data block is either read from a cache or retrieved from a storage device if it does not reside in the cache to evaluate the sharing status of the file system data block. Further, in such a system, the delegated reference count value included in a mapping pointer of a file system data block is compared with the total distributed reference count value ("weight") stored in the per-block metadata.

In at least one embodiment of the current technique, sharing status of each file system data block listed in the list 242 is evaluated to determine whether the file system data block can be freed if no other active snap refers to the file system data block. Upon determining that a file system block is "owned" indicating that the file system data block has not been shared by any other active snap and is only referenced by a file selected for deletion, the file system block may be deallocated and storage space associated with the file system data block may be reclaimed as free storage. However, upon determining that a file system data block is "shared" indicating that the file system data block is either shared by more than one snap where one of the snap may not have been selected for deletion, the reference to the file system data is decremented by using the delegating reference counting mechanism described above herein.

Referring to FIG. 9, shown is a flow diagram illustrating a flow of data in the data storage system. With reference also to FIGS. 1-8, in at least one embodiment of the current technique, a file delete or a file truncate operation is performed on a file (step 500). A file delete operation deletes the entire contents of a file identified for deletion. However, a file truncate operation performed on a file reduces the size of the file by deleting a portion of the file. Upon receiving a request to either delete a file or truncate a file by deleting a portion of the file, a list of extents associated with the portion of the file identified for deletion is determined (step 502). An internal snapshot copy of file system blocks included in the list of extents is created (step 504). Thus, the internal snapshot copy represents only that portion of a file which has been identified for deletion instead of the entire file. Thus, the internal snapshot copy and the file shares only those file system blocks that included in the list of extents identified for deletion. The portion of the file identified for truncation is deleted by using delegated reference count mechanism described above herein which includes updating metadata of file system blocks associated with the portion of the file (step 506). The file system blocks associated with the portion of the file identified for truncation are shared with the internal snapshot copy of the file thereby enabling a storage system to delete such shared file system blocks in a short amount of time by simply returning respective distributed weight of each shared file system block. The internal snapshot copy of the file is asynchronously deleted by a background process at a later time (step 508). The internal snapshot copy of the file is deleted efficiently and in a short amount of time because the internal snapshot copy only includes the file system blocks that are associated with the portion of the file identified for deletion.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in managing truncation of files of file systems, the method comprising
receiving a request to delete a portion of a file of a file system, wherein a file system mapping component manages the file system, wherein the file system includes a set of files, each file associated with extents, each file associated with an inode, wherein the inode of a file includes metadata of the file, wherein the file system is associated with a set of sparse volumes, wherein a sparse volume includes a set of slices, each slice of the set of slices is a logical representation of a subset of physical disk storage;
determining a set of extents associated with the portion of the file identified for deletion;
creating a replica of the set of extents, wherein the replica represents a state of the set of extents at a particular prior point in time;
deleting the portion of the file by updating metadata of the file to indicate that the portion of the file no longer references to the replica thereby enabling the deletion of the portion of the file without having to deallocate each extent associated with the portion of the file; and
asynchronously deleting the replica in background.

2. The method of claim 1, wherein the replica is an internal snapshot of the file, wherein the internal snapshot is not accessible to a user of the file.

3. The method of claim 1, wherein the replica includes holes at locations within a logical address space of the replica, wherein the locations indicates file systems blocks of the file that are not included in the set of extents.

4. The method of claim 1, wherein the portion of the file is deleted based on a delegated reference counting mechanism.

5. The method of claim 1, wherein the file is truncated in size by deleting the portion of the file.

6. The method of claim 1, wherein the portion of the file selected for deletion is associated with a set of indirect data blocks, each indirect data block of the set of indirect blocks pointing to a set of data blocks.

7. The method of claim 1, wherein the file includes a set of file system blocks, wherein a mapping pointer is associated with a file system block, wherein the mapping pointer includes a distributed weight indicating whether the file system block has been shared.

8. The method of claim 1, wherein updating the metadata of the file includes adding weight of each file system block shared between the replica and the file to a mapping pointer associated with each shared file system block.

9. The method of claim 1, wherein the file system resides on a storage system, wherein the storage system includes a disk drive system comprising a plurality of Redundant Array of Inexpensive Disks (RAID) systems, each RAID system of the plurality of RAID systems having a first disk drive and a second disk drive.

10. A system for use in managing truncation of files of file systems, the system comprising a processor configured to:
receive a request to delete a portion of a file of a file system, wherein a file system mapping component manages the file system, wherein the file system includes a set of files, each file associated with extents, each file associated with an inode, wherein the inode of a file includes metadata of the file, wherein the file system is associated with a set of sparse volumes, wherein a sparse volume includes a set of slices, each slice of the set of slices is a logical representation of a subset of physical disk storage;
determine a set of extents associated with the portion of the file identified for deletion;
create a replica of the set of extents, wherein the replica represents a state of the set of extents at a particular prior point in time;
delete the portion of the file by updating metadata of the file to indicate that the portion of the file no longer references to the replica thereby enabling the deletion of the portion of the file without having to deallocate each extent associated with the portion of the file; and
asynchronously delete the replica in background.

11. The system of claim 10, wherein the replica is an internal snapshot of the file, wherein the internal snapshot is not accessible to a user of the file.

12. The system of claim 10, wherein the replica includes holes at locations within a logical address space of the replica, wherein the locations indicates file systems blocks of the file that are not included in the set of extents.

13. The system of claim 10, wherein the portion of the file is deleted based on a delegated reference counting mechanism.

14. The system of claim 10, wherein the file is truncated in size by deleting the portion of the file.

15. The system of claim 10, wherein the portion of the file selected for deletion is associated with a set of indirect data blocks, each indirect data block of the set of indirect blocks pointing to a set of data blocks.

16. The system of claim 10, wherein the file includes a set of file system blocks, wherein a mapping pointer is associated with a file system block, wherein the mapping pointer includes a distributed weight indicating whether the file system block has been shared.

17. The system of claim 10, wherein updating the metadata of the file includes adding weight of each file system block shared between the replica and the file to a mapping pointer associated with each shared file system block.

18. The system of claim 10, wherein the file resides on a storage system, wherein the storage system includes a disk drive system comprising a plurality of Redundant Array of Inexpensive Disks (RAID) systems, each RAID system of the plurality of RAID systems having a first disk drive and a second disk drive.

\* \* \* \* \*